(12) United States Patent  
Maram et al.

(10) Patent No.: US 9,037,830 B2  
(45) Date of Patent: *May 19, 2015

(54) ORGANIZATION OF A SMALL OBJECT AREA AND A LARGE OBJECT AREA IN A JAVA HEAP

(71) Applicant: INTERNATIONAL BUSINESS MACHINES CORPORATION, Armonk, NY (US)

(72) Inventors: Bhaktavatsal Maram, Bangalore (IN); Vinod Nalla, Bangalore (IN); Bipin Patil, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,216

(22) Filed: Jun. 25, 2014

(65) Prior Publication Data

US 2014/0310498 A1     Oct. 16, 2014

Related U.S. Application Data

(63) Continuation of application No. 12/909,217, filed on Oct. 21, 2010, now Pat. No. 8,799,615.

(51) Int. Cl.
*G06F 12/00* (2006.01)
*G06F 3/06* (2006.01)
*G06F 12/02* (2006.01)
*G06F 12/14* (2006.01)

(52) U.S. Cl.
CPC .......... *G06F 3/0631* (2013.01); *G06F 12/0253* (2013.01); *G06F 3/0628* (2013.01); *G06F 12/1416* (2013.01); *G06F 2212/702* (2013.01)

(58) Field of Classification Search
CPC .. G06F 3/0628; G06F 3/0631; G06F 12/0253; G06F 12/1416
USPC ........................... 711/158, 165, 171; 707/820
See application file for complete search history.

(56) References Cited

U.S. PATENT DOCUMENTS

| | | |
|---|---|---|
| 5,535,329 A | 7/1996 | Hastings |
| 6,938,245 B1 | 8/2005 | Spertus et al. |
| 7,024,436 B2 | 4/2006 | Kolodner et al. |
| 7,111,294 B2 | 9/2006 | Steensgaard |
| 7,130,979 B2 * | 10/2006 | Wong ............................. 711/165 |
| 7,155,467 B1 | 12/2006 | Rohrs |
| 7,533,228 B1 | 5/2009 | Garthwaite |
| 7,779,054 B1 | 8/2010 | Printezis et al. |

(Continued)

OTHER PUBLICATIONS

Maheshwari, U. et al., "Partitioned Garbage Collection of a Large Object Store", SIGMOD 1997, ACM SIGMOD International Conference on Management of Data, May 13-15, 1997, Tucson AZ, USA.

(Continued)

*Primary Examiner* — Reba I Elmore
(74) *Attorney, Agent, or Firm* — Thomas E. Lees, LLC

(57) ABSTRACT

A memory heap is allocated to a contiguous range of memory. One end of the heap is designated as a small object area. The other end of the heap is designated as a large object area. When the two object areas grow, the small object area grows inward within the heap toward the large object area, and the large object area grows inward within the heap toward the small object area.

24 Claims, 7 Drawing Sheets

(56) References Cited

U.S. PATENT DOCUMENTS

2005/0172271 A1* 8/2005 Spertus et al. ............... 717/125
2009/0019249 A1 1/2009 Kessler et al.
2009/0112952 A1 4/2009 Adams, III et al.

OTHER PUBLICATIONS

U.S. Appl. No. 12/909,217, filed Oct. 21, 2010, Bhaktavatsal Maram et al.

* cited by examiner

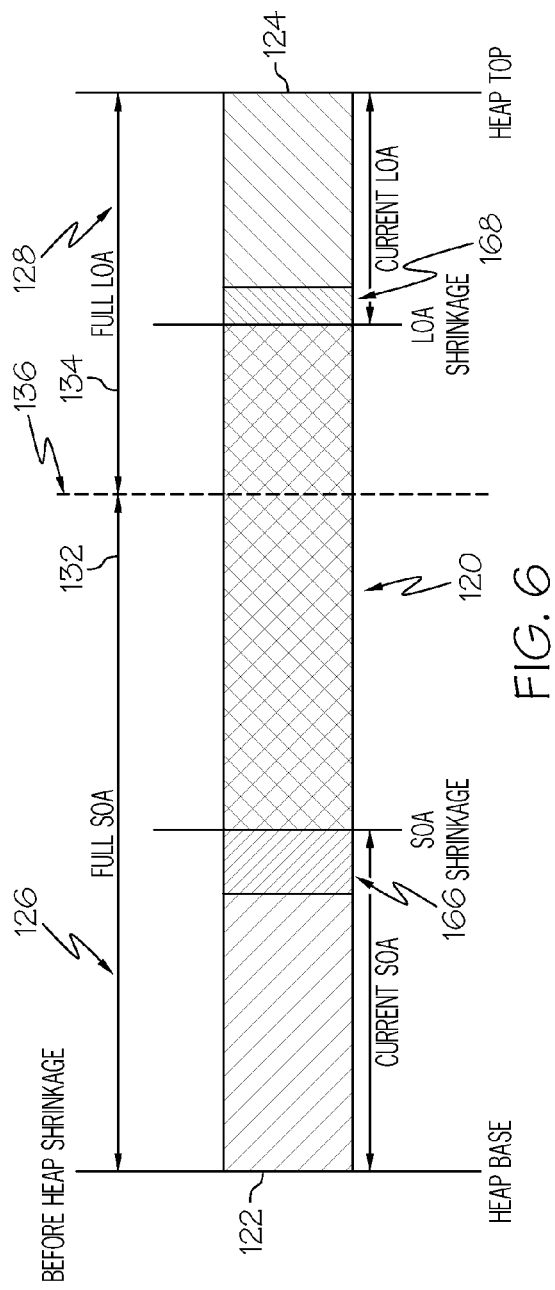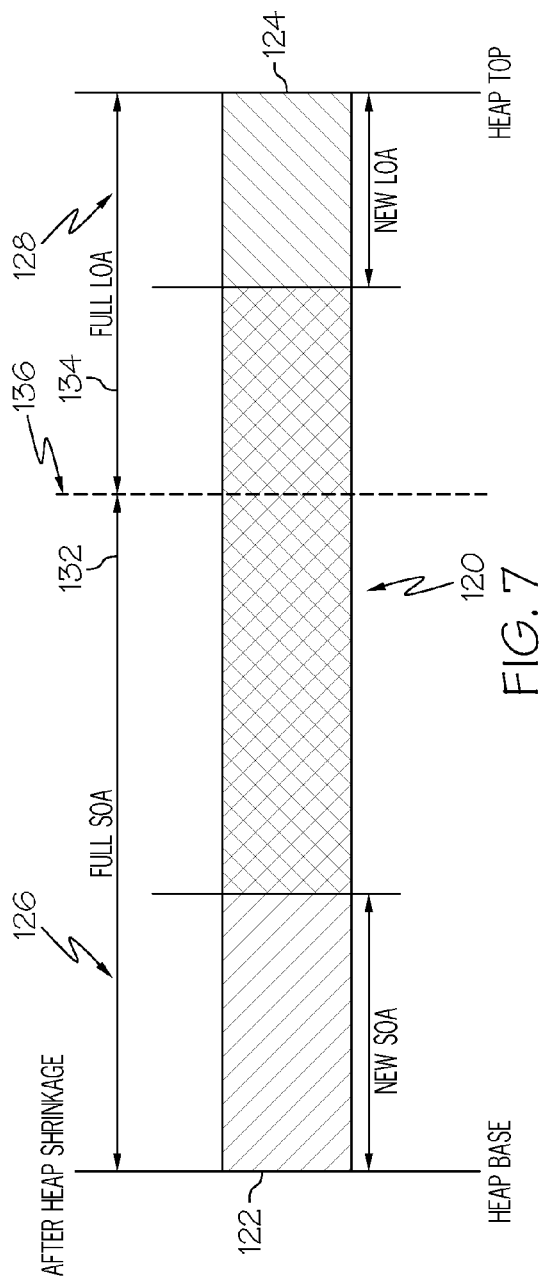

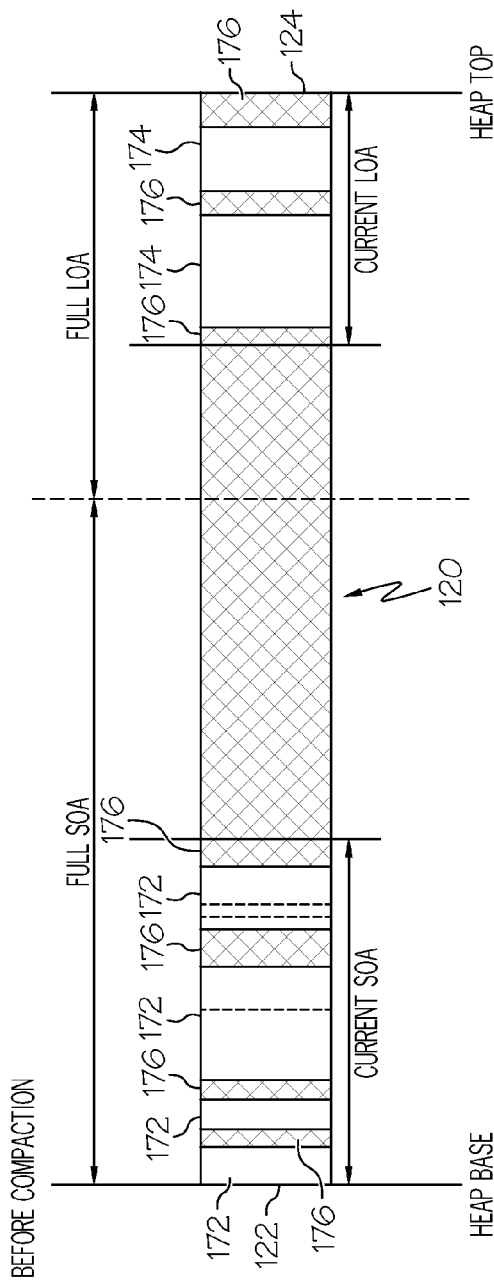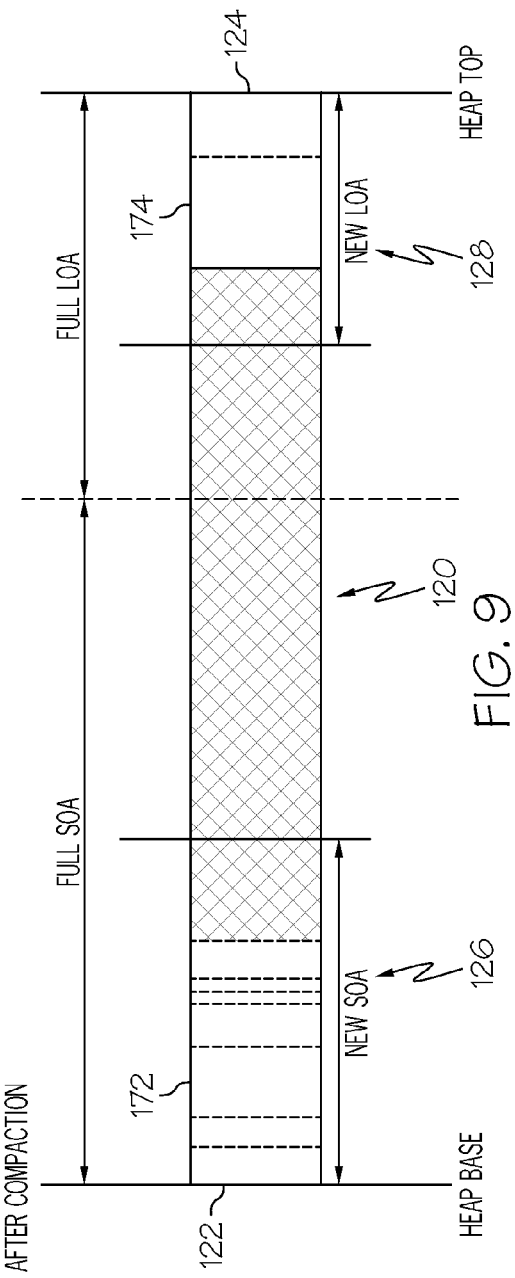

ORGANIZATION OF A SMALL OBJECT AREA AND A LARGE OBJECT AREA IN A JAVA HEAP

BACKGROUND

Various aspects of the present invention relate generally to the utilization of a memory heap, and more particularly, to the efficient organization and utilization of small and large object areas within a memory heap.

A Java Virtual Machine (JVM) reserves a slot of memory, referred to as a Java heap, to temporarily store java application created objects. The Java Virtual Machine determines the size of the Java heap based in part, upon two user-controllable parameters, including an Initial Heap Size parameter and a Maximum Heap Size parameter.

At start up, the Java Virtual Machine reserves a single, contiguous chunk of memory for the Java heap from the operating system, based upon the Maximum Heap Size parameter. However, the Java Virtual Machine starts using the Java heap for object allocations as if it were configured using the Initial Heap Size parameter. In use, applications allocate objects into the Java heap. As the number of allocated objects increase, the Java heap can grow up to the maximum heap size established by the Maximum Heap Size parameter, to accommodate the allocated objects.

During use, objects in the heap may eventually become unreferenced. In this regard, a process referred to as a Garbage Collector (GC) occasionally cleans the Java heap by finding and removing unreferenced objects from the heap. The Garbage Collector thus frees memory, which allows applications to continue to allocate objects within the heap. Also, over time, the Java heap becomes fragmented. Fragmentation can cause the Garbage Collector to perform cleanup operations more frequently relative to an un-fragmented heap. Moreover, the cost of allocating a new object to the Java heap can potentially increase during use, e.g., due to the time required to locate a free memory chunk large enough to store the new object within a fragmented heap compared to a relatively un-fragmented heap. As such, the Garbage Collector may eventually be required to perform compaction of the Java heap. Compaction is an expensive process to perform due to the time required to move objects and update references to objects within the heap. Compaction and frequent cleanup can thus degrade performance of the Java Virtual Machine.

BRIEF SUMMARY

According to aspects of the present invention, systems, methods and computer program products are provided for managing multiple object areas in a memory heap, comprising allocating a memory heap as a contiguous range of memory, allocating a small object area within the memory heap having an initial start at a first end of the memory heap and allocating a large object area within the memory heap having an initial start at a second end of the memory heap opposite the first end such that the small object area and the large object area grow in opposite directions inward within the memory heap.

Further, the systems, methods and computer program products comprise performing allocations into the memory heap based upon a predetermined allocation policy such that the large object area is reserved for the allocation of large objects. For instance, the predetermined allocation policy may define allocations into the memory heap such that only small objects are allocated into the small object area and only large objects are allocated into the large object area of the memory heap. Alternatively, the predetermined allocation policy may define allocations into the memory heap such that small and large objects are initially allocated into the small object area until a predetermined condition is satisfied, there after, large objects are allocated into the large object area of the memory heap.

BRIEF DESCRIPTION OF THE SEVERAL VIEWS OF THE DRAWINGS

FIG. 6 is a diagram illustrating a heap shrinkage of the Java Heap of FIG. 2 before a shrinkage operation, according to various aspects of the present invention;

FIG. 7 is a diagram illustrating a heap shrinkage of the Java Heap of FIG. 2 after a shrinkage operation, according to various aspects of the present invention;

FIG. 8 is a diagram illustrating a Java heap before compaction, according to various aspects of the present invention;

FIG. 9 is a diagram illustrating a Java heap after compaction, according to various aspects of the present invention.

DETAILED DESCRIPTION

Various aspects of the present invention reduce Garbage Collection overhead in a Java heap, by providing a model for the efficient organization of a small object area (SOA) and a large object area (LOA) within a corresponding Java heap. In this regard, various aspects of the present invention further provide models for managing a Java heap, which implement heap compaction, expansion and shrinkage so as to achieve improved application throughput compared to conventional Java heaps.

Figure 1:
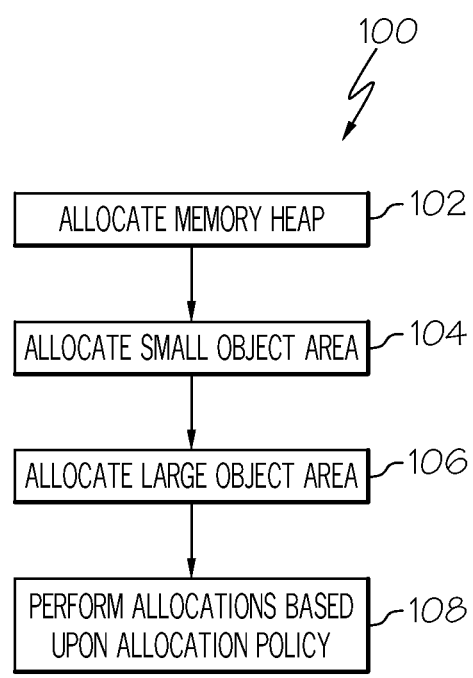
FIG. 1 is a flow chart illustrating a method of allocating objects into a Java heap according to various aspects of the present invention.

Referring now to the drawings, and in particular, to FIG. 1, a method 100 of managing multiple object areas in a memory heap is illustrated. The method may be embodied, for example, as a computer program product comprising a computer readable storage medium having computer readable program code embodied therewith, the computer readable program code configured to implement the below described method. Moreover, the method may be implemented by a processor of a computing device executing instructions stored in a memory device for creating and maintaining a memory heap. The method 100 may be used, for example, to allocate and operate a Java heap in a processing device, which may include a Java Virtual Machine.

The method comprises allocating a memory heap as a contiguous range of memory at 102, allocating a small object area within the memory heap at 104 and allocating a large object area within the memory heap at 106. Particularly, the small object area is allocated within the memory heap so as to have an initial starting position at a first end of the memory heap. Correspondingly, the large object area is allocated within the memory heap so as to have an initial starting position at a second end of the memory heap opposite the first end such that the small object area and the large object area grow in opposite directions inward within the memory heap.

The method 100 further comprises performing allocations into the memory heap at 108 based upon a predetermined allocation policy. For instance, in use, the allocation policy may define allocations into the memory heap such that only small objects are allocated into the small object area and only large objects are allocated into the large object area of the memory heap. As yet another illustrative example, the predetermined allocation policy may define allocations into the memory heap such that small and large objects are initially allocated into the small object area until a predetermined condition is satisfied, thereafter, large objects are allocated into the large object area of the memory heap.

In the above illustrative examples, the allocation policy is utilized for allocating objects starting at different ends of a memory heap. The large object area is reserved for allocating large objects. The small object area may correspondingly be reserved for allocating small objects, or the small object area may be used to allocate small and large objects, e.g., until a predetermined condition is satisfied. After the predetermined condition is satisfied, the allocation policy may allocate subsequent large objects in the large object area and small objects in the small object area of the memory heap. Thus, the allocation may be exclusively based on the size of the objects (small/large objects). Alternatively, the allocation may be based upon the size of the objects being allocated in combination with a predetermined condition that is satisfied. Exemplary conditions may include: a condition where the small object area is too fragmented to allocate a new large object, a condition where a predetermined percentage of the current small object area is already allocated, a condition based upon the size of the current small and large object areas of the heap, a condition based upon the availability of memory chunks within the small object area and/or large object area of the heap to allocate a new object, a condition based upon the percentage of the memory that is already allocated in the small and/or large object areas, heap usage, and/or a condition based upon one or more other factors that affect heap performance and/or operation.

Figure 2:
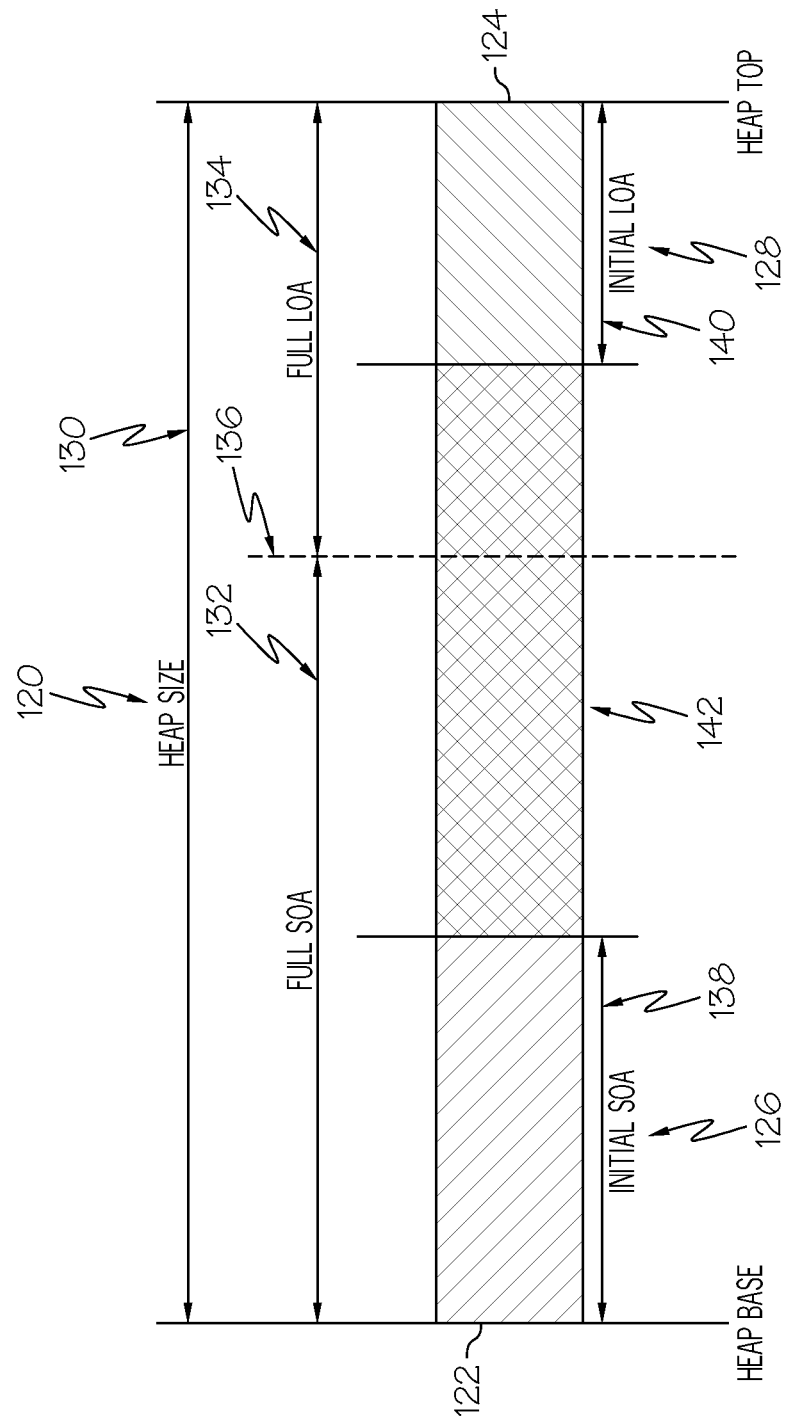
FIG. 2 is a diagram of a Java heap according to various aspects of the present invention.

Referring to FIG. 2, a memory heap 120 is allocated as a contiguous block of memory. As illustrated, the heap 120 is defined by a heap base 122, a heap top 124 and a plurality of memory locations arranged in a contiguous block of memory between the heap base 122 and the heap top 124. A small object area 126 is allocated within the memory heap 120 starting at the heap base 122. Correspondingly, a large object area 128 is allocated within the memory heap 120 starting at the heap top 124. In this regard, the small object area 126 and the large object area 128 start on opposite ends of the memory heap 120 and grow in opposite directions towards one another.

The memory heap 120 is allocated so as to have a predetermined memory heap size 130. The heap size 130 may be user-configured or otherwise determined. The heap size 130 is subdivided into two regions, including a full small object area size 132 and a full large object area size 134, which are separated from one another by a boundary 136. That is, the full small object area 132 is the contiguous memory that spans between the heap base 122 and boundary 136. Similarly, the full large object area 134 is the contiguous memory that spans between the heap top 124 and the boundary 136. The full small object area 132 and/or the full large object area 134 may be user-determined and/or adjustable, examples of which are described in greater detail herein. In the illustrative example:

full small object area 132+the full large object area 134=heap size 130

Moreover, one or more of the heap size 130, full small object area 132, full large object area 134 and boundary 136 may be computed from the other known full heap size parameters. As an illustrative example, a ratio may be determined, which sets the relative ratio between the full small object area size 132 and the full large object area size 134. Thus, by knowing a ratio and one of the heap size 130, full small object area size 132 or full large object area size 134, the remainder of the full heap size parameters can be determined. Depending on the ratio set between "small object area" and "large object area" the initial heap size is split and used from opposite ends of the heap. The small object area and the large object area grow in opposite directions inwards.

According to further aspects of the present invention, an initial small object area 138 may be initialized. The initial small object area 138 is typically allocated to a size less than the full small object area 132, starting from the heap base 122. Similarly, an initial large object area 140 may be initialized. The initial large object area 140 is typically allocated to a size less than the full large object area 134, starting from the heap top 124. A gap 142 between the small object area and large object area, e.g., as represented as the gap between the initial small object area 138 and the initial large object area 140, represents an unallocated region.

The size of the initial small object area 138 and the size of the initial large object area 140 may also be user-determined and/or adjustable, as will be described in greater detail herein. For instance, the current small object area can grow up to the size of the full small object area 132, and the current small object area can shrink from a relatively larger size. Similarly, the current large object area can grow up to the size of the full large object area 134, and the current large object area can shrink from a relatively larger size. Moreover, under certain allocation policies, it may be possibly to relocate the boundary 136 to simultaneously grow/shrink the full small object area 132 and the full large object area 134. According to still further aspects of the present invention, the small object area 126 and the large object area 128 in the memory heap 120 can be used independently. This facilitates flexibility in allocation, as well as in heap cleanup, as will be described in greater detail herein.

Free Lists

Figure 3:
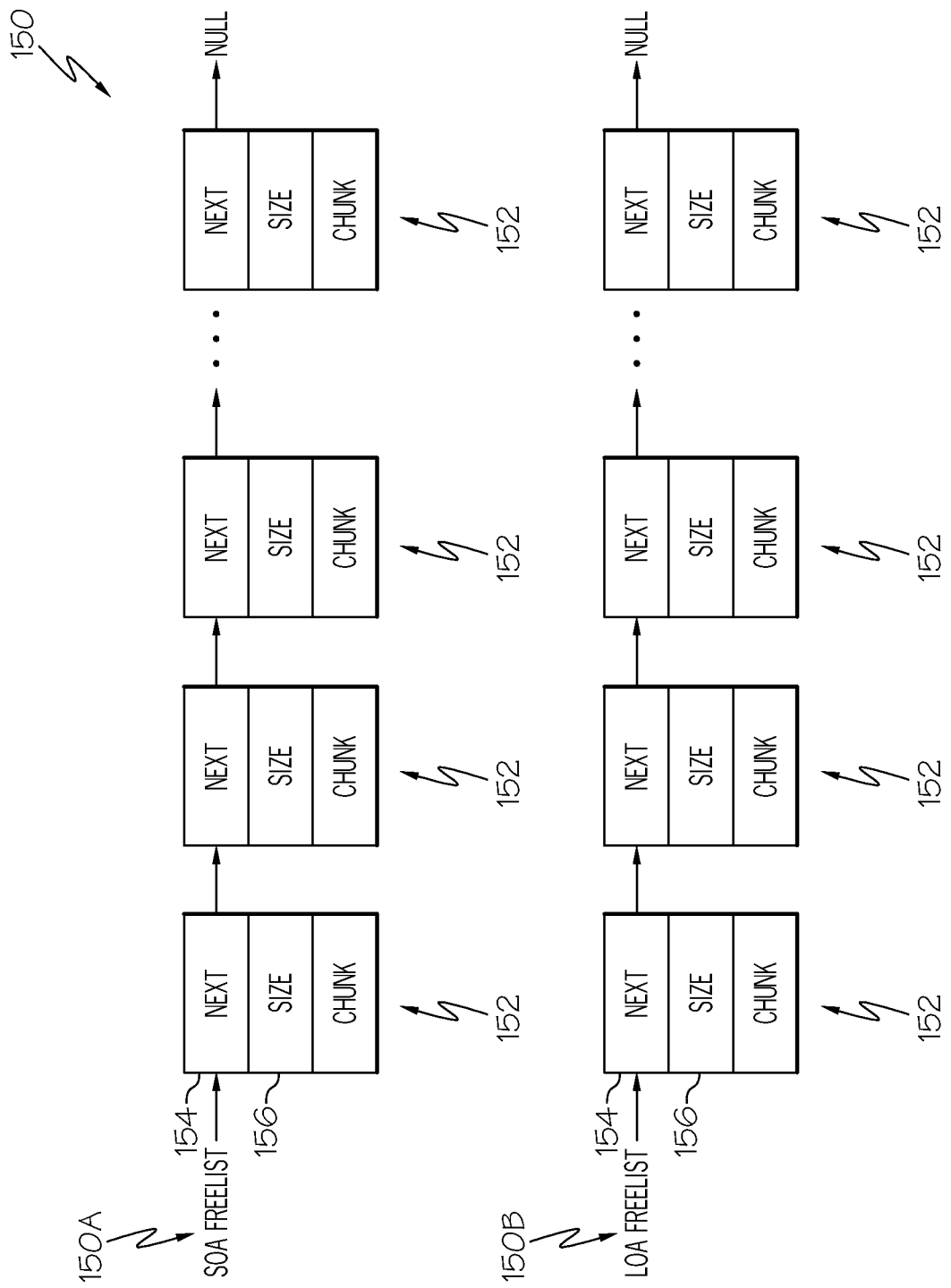
FIG. 3 is an illustration of free lists used to manage the Java heap of FIG. 2, according to various aspects of the present invention.

Referring to FIG. 3, an exemplary approach to manage the memory heap 120 is to utilize one or more free space lists. As illustrated, two free lists 150 are illustrated, including a free list 150A for the small object area and a free list 150B for the large object area. The utilization of two free lists 150A, 150B allows for independent management and allocation of the small object area and the large object area.

According to aspects of the present invention, the head of each free list 150A, 150B resides in a global storage and points to the first free chunk on the heap. For instance, prior to first use, the head for the small object area 126 points to the heap base 122. Similarly, the head for the large object area points to the heap top 124. As illustrated, each free list 150A, 150B comprises a plurality of records 152. Each record 152 identifies a chunk of free storage that can be used for the allocation of an object into the heap. Each record 152 includes a pointer 154 that points to the next free chunk and a size field 156. In an illustrative example, the records 152 identifying free chunks of memory within the heap 120 are in address order. The last free chunk has a NULL pointer.

Thus, according to aspects of the present invention, free space available in the small object area 126 of a heap 120 is maintained in a first free list 150A and free space available in the large object area 128 of the heap 120 is maintained in a second free list 150B. As an illustration, a first free list comprises the size and next address of free space solely for the small object area, and a second free list comprises the size and next address of free space solely for the large object area.

In this regard, the available space in the small object area and large object area are maintained separately in two different free lists to accommodate independent object allocation requests on the respective small object area and large object area of the heap 120. However, the small object area free list 150A is address ordered opposite the large object area free list 150B. For instance, the small object area free list 150A may be addressed from lower address chunks to relatively higher address chunks, and the large object area free list 154 is address ordered from higher address chunks to relatively lower address chunks.

Thus, assume for example, that a new small object is to be allocated. The heap 120 is maintained by reading the small object area free list 150A until a chunk of memory is located that has a size sufficient for the new object. The object is allocated, and the free list 150A is updated to reflect the changed availability of memory in the heap 120. In this regard, the large object area free list 150B does not need to be read or otherwise altered. Similarly, assume for example, that a new large object is to be allocated. The heap 120 is maintained by reading the large object area free list 150B until a chunk of memory is located that has a size sufficient for the new object. The object is allocated, and the free list 150B is updated to reflect the changed availability of memory in the heap 120. In this regard, the small object area free list 150A does not need to be read or otherwise altered.

In order to provide optimal performance of the memory heap, the heap size should be set or otherwise adjusted to a corresponding optimal level that avoids undue maintenance actions to be required.

Garbage Collector

During operation, objects in the heap eventually become unreferenced. However, a process referred to as a Garbage Collector (GC) occasionally cleans the memory heap 120 by finding and removing unreferenced objects from the heap. The Garbage Collector thus frees memory, which allows applications to continue to allocate objects within the memory heap 120. The Garbage Collector is also capable of performing cleanup operations such as compaction to deal with fragmentation of the heap 120. According to aspects of the present invention, the Garbage Collector operation efficiency is increased by enabling independent garbage collection operations within the small object area 126 and the large object area 128.

In this regard, the heap is organized and utilized so as to reduce the number of garbage collection cycles triggered because of improper distribution of free space among the small object area 126 and the large object area 128. Moreover, the heap 120 is managed so as to avoid the overhead and processing cost of object movements between the small object area and the large object area. This organization makes heap expansions, shrinkages and compaction far easier, simpler and economical. In this regard, management of the heap may be implemented to provide independent heap expansions and shrinkages, fair free space allocations during expansion and fair free space de-allocation during shrinkage. Moreover, no burden of object movement between the small object area and the large object area is imposed, thus providing less costlier compaction, more controlled heap sizes and more flexible transfer of space between the small object area and the large object area.

For instance, according to aspects of the present invention, a Garbage Collector is utilized to perform operations to maintain and manage a Java heap. Good performance of the Garbage Collector is maintained by establishing an optimum heap size. In this regard, methods of managing the heap 120 comprise independent allocations into the small object area 126 and large object area 128, e.g., as established by a predetermined allocation policy, and by cleanup and maintenance of the memory heap 120, which may also occur independently in the small object area 126 and large object area 128 of the memory heap 120.

Heap Expansion

Figure 4:
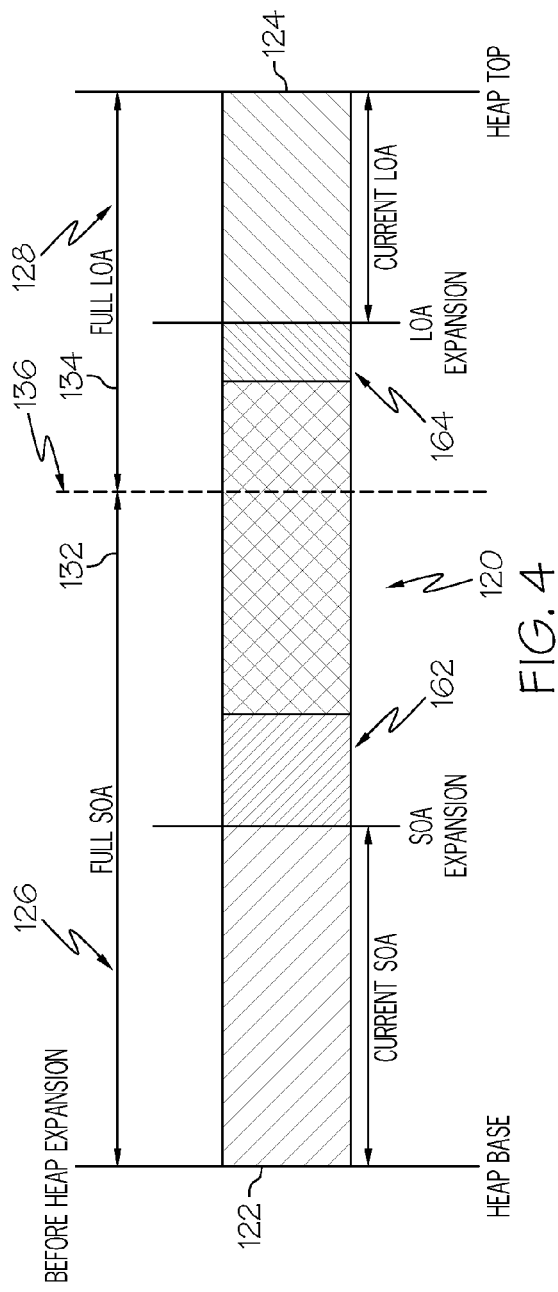
FIG. 4 is a diagram illustrating a heap expansion of the Java Heap of FIG. 2 before an expansion operation, according to various aspects of the present invention.

Referring to FIG. 4, heap expansion is illustrated for both the small object area 126 and the large object area 128 for purposes of clarity of discussion. In certain illustrative implementations, the current size of the small object area and/or the large object area can be increased to gain additional memory for allocations. The small object area and the large object area are expanded in opposite directions, each towards the boundary 136. For instance, the current size of the small object area may be less than the full small object area size. In this case, it is possible to expand the current size of the small object area. Alternatively, under certain allocation policies, it may be possible to extend the small object area size beyond the full small object area 132, such as where the large object area size is less than the full large object area 134, e.g., by relocating the boundary 136 between the small object area 126 and the large object area 128.

Figure 5:
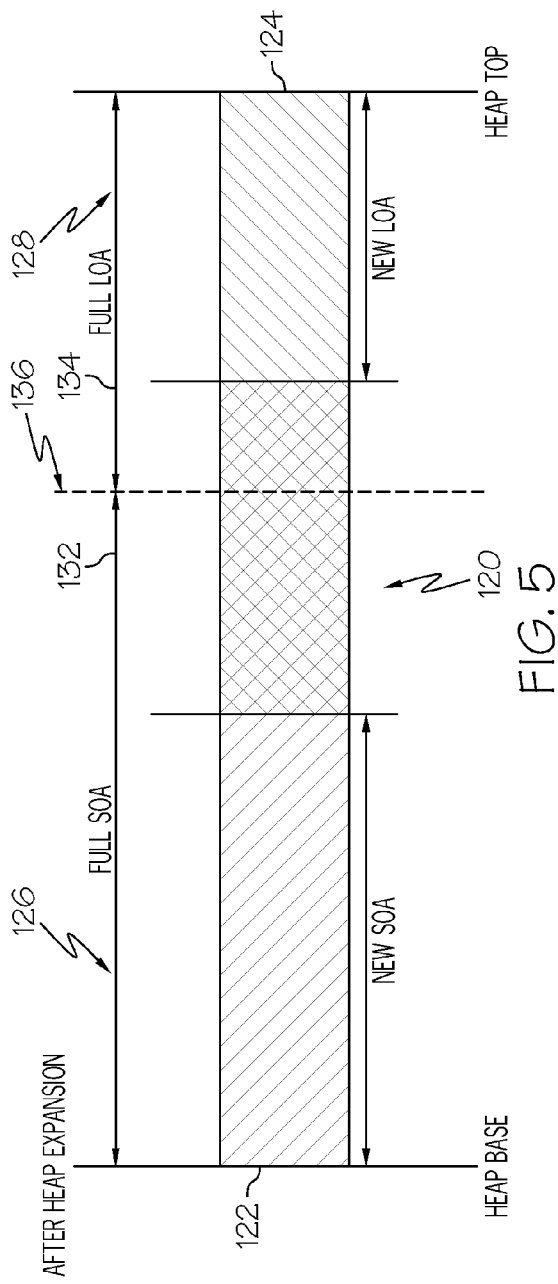
FIG. 5 is a diagram illustrating a heap expansion of the Java Heap of FIG. 2 after an expansion operation, according to various aspects of the present invention.

As illustrated in FIG. 4, a first exemplary heap expansion is performed to expand the size of the small object area 126 by a desired amount corresponding to an amount designated by the small object area expansion 162. In this illustrative example, the current small object area size plus the desired small object expansion size is less than the full small object area size. As such, the boundary 136 does not need to be relocated. Referring briefly to FIG. 5, after the first heap expansion is performed, the new small object area size is adjusted to include the small object expansion 162.

Referring back to FIG. 4, in an analogous manner, a second exemplary heap expansion is performed to expand the size of the large object area 128 by a desired amount corresponding to an amount designated by the large object area expansion 164. In this illustrative example, the current large object area size plus the desired large object expansion size is less than the full large object area size. As such, the boundary 136 does not need to be relocated. Referring briefly to FIG. 5, after the second heap expansion is performed, the new large object area size is adjusted to include the large object expansion 164.

FIG. 5 illustrates the heap 120 after completing the second heap expansion. As illustrated, the small object area is expanded to include the additional memory requested by the expansion operation. In view of the increased memory capacity of the small object area, the corresponding small object area free list 150A is updated to include the memory addresses and size of the additional storage space within the small object area expansion 162. Similarly, the large object area is expanded to include the additional memory requested by the corresponding large object area expansion operation. In view of the increased memory capacity of the large object area, the corresponding large object area free list 150B is updated to include the memory addresses and size of the additional storage space within the large object area expansion 164.

Heap expansion may occur for example, after a Garbage Collector operation is implemented. In practice, any number of methods may be utilized to determine the size of the expansion. For instance, the small object area 126 may be expanded up to the maximum (e.g., full small object area size 132) if, for example, the Garbage Collector did not free sufficient storage to satisfy the allocation request, or where free space is less than a predetermined minimum free space requirement, which can be set by a user. Expansion may also be implemented, for instance, where more than X % of time is being spent in garbage collection, etc., where X is a determined percentage of time. Still further, the amount to expand may be calculated based upon one or more formulas, including the use of different formulas or formula variables depending upon the reason for the expansion, e.g., out of memory, too much time in garbage collection, etc.

Heap Shrinkage

Referring to FIG. 6, as noted above, the heap can expand when there is a shortage of free space available on the heap. Correspondingly, the heap can shrink in the presence of excessive amount of free space on the heap to achieve optimum garbage collector performance.

Heap shrinkage is illustrated for both the small object area and the large object area for purposes of clarity of discussion. Shrinkage of the small object area and the large object area occurs in opposite directions away from the boundary 136. In certain illustrative implementations, the current size of the small object area and/or the large object area can be decreased. For instance, a heap that is not being used extensively may take advantage of a smaller heap size for the small object area and/or for the large object area by decreasing the current size. Shrinking may be useful for several other functions. For instance, shrinking either the small object area and/or the large object area may be useful or necessary to relocate the boundary 136.

As illustrated in FIG. 6, a first exemplary heap shrinkage is performed to shrink the size of the small object area 126 by an amount corresponding to a small object area shrinkage 166. Referring briefly to FIG. 7, after the first heap shrinkage is performed, the new small object area size is decreased in size to exclude the small object shrinkage 166. In this regard, the small object area still begins from the heap base 122.

Referring back to FIG. 6, a second exemplary heap shrinkage is performed to shrink the size of the large object area 128 by an amount corresponding to a large object area shrinkage 168. Referring briefly to FIG. 7, after the second heap shrinkage is performed, the new large object area size is decreased in size to exclude the large object shrinkage 168. In this regard, the large object area still begins from the heap top 124.

Referring to FIG. 7, the heap 120 is illustrated after completing the second heap shrinkage. As illustrated, the small object area is shrunk to release memory as requested by the first shrinkage operation. In view of the decreased memory capacity of the small object area 126, the corresponding small object area free list 150A is updated to release the memory address chunks associated with the small object area shrinkage 166. Similarly, the large object area is shrunk to release memory as requested by the second exemplary shrinkage operation. In view of the decreased memory capacity of the large object area 128, the corresponding large object area free list 150B is updated to release the memory address chunks associated with the large object area shrinkage 168.

Heap shrinkage may also occur after garbage collection. The Garbage Collector may refrain from shrinking the heap, e.g., where the Garbage Collector did not free sufficient space to satisfy an outstanding allocation request. It may be possible to adjust a parameter such as a maximum free space parameter to 100%. In this regard, no shrinkage can occur. Other factors may also/alternatively be considered not shrink the heap 120. Still further, the amount to shrink may be calculated based upon one or more formulas, including the use of different formulas or formula variables depending upon the reason for the shrinkage, e.g., out of memory, too much time in garbage collection, etc.

Compaction

Compaction is a phase of the garbage collection process where all the live objects remaining after the garbage collection cycle within the small object area are gathered at the heap base and/or all live objects remaining after the garbage collection cycle within the large object area are gathered at the heap top. The compaction operation thus executes to attempt to make the small object area and/or the large object area free of fragmentation.

Allocation of large objects into a fragmented heap can cause frequent garbage collections which leads to an inefficiency of heap operation. Compaction is a relatively costly operation as the compaction operation has to move the objects in the heap and update all the addresses that reference moved objects in the heap. However, according to various aspects of the present invention, compaction can be run only in small object area, in the large object area or in both the small object area and the large object and area, e.g., depending on the necessity for compaction in that area. Fragmentation can be caused mainly because of small objects allocation and removal, so the large object area need not be compacted as many times as small object area may be needed. As such, according to aspects of the present invention, many compactions can be avoided in the large object area, thus improving the compaction times in garbage collection.

FIG. 8 illustrates an exemplary scenario where heap organization allows compaction of the heap independently in the small object area and in the large object area according to aspects of the present invention. As illustrated, small object area 126 includes a plurality of small objects 172. Similarly, the large object area includes a plurality of large object 174. In this illustrative example, the small object area is fragmented. That is, fragments 176 are positioned between the small objects 172. Similarly, the large object area is fragmented as illustrated by the fragments 176 between the large objects 174.

In a first illustrative compaction operation, only the small object area is compacted. In a second illustrative compaction operation, only the large object area is compacted. Referring to FIG. 9, the heap 120 is illustrated after the second compaction operation. All the small objects 172 in the small object area 126 are moved to the heap base 122 and all the large objects in large object area 128 are moved to the heap top 124.

Compaction may occur, for example, if there is insufficient free space to satisfy an allocation request after operation of a cleaning phase in a garbage collection process, if there is a lot of free space left and an allocation failure still happens, etc.

Miscellaneous

According to aspects of the present invention, any desired decision logic may be implemented in determining whether to perform heap upkeep. By way of illustration, virtual machines can have independent heuristics to decide whether to expand/shrink a corresponding heap, which may include expansion/shrinkage of a small object area, a large object area or both. Also, the decision logic may control the amount of expansion/shrinkage of the small object area and/or the large object area, e.g., to exploit the differences in object allocation patterns in small object area and/or the large object area.

As another illustrative example, if there is no strict rule to always preserve a fixed ratio of the large object area against the full heap size, then either the small object area and/or large object area expansion can go beyond, and thus relocate the boundary whenever required. In this regard, the heap organization allows efficient usage of the heap. As such, applications can run on a virtual machine with a relatively smaller heap footprint compared to the heap footprint required by conventional heaps.

According to aspects of the present invention, as noted in greater detail herein, the heap is managed so as to distribute free space among the small object area and the large object area within a heap so as to avoid unnecessary garbage collections. Moreover, the heap is managed so as to share expanded free space among the small object area and the large object area within the heap and reclaim free space during heap shrinkage. Still further, the heap is managed so as to avoid unintended movement between areas of a heap during compaction.

Thus, various aspects of the present invention provide systems and methods for reducing the number of garbage collection cycles triggered due to improper distribution of free space among the small object area and the large object area within a heap. In this regard, various heap operations provide for organizing an "initial heap" allocated for a small object area and a large object area at different ends of a Java heap. Aspects disclosed herein provide for separately maintaining free space for the small object area and large object area of the heap for independent object allocation in either the small object area or the large object area. Aspects further provide for independently performing compaction/expansion/shrinkage of the small object area and large object area, which may include independently compacting, expanding, and shrinking a small object area and a large object area of a heap based on different policies/criteria.

Also, the heap organizations described herein provide heap management that avoids the issues of improper sharing of expanded free space, improper reclamation of free space during heap shrinkage and unfair object movement between areas of a heap during compaction.

The large object area described herein addresses issues of fragmentation caused by pinned objects or conservative garbage collection operations, thus allowing applications to run longer without Garbage Collection triggers for larger objects allocations. The frequency of compaction will also get reduced with the implementation of the large object area described herein, as allocating small objects is not as big an issue in fragmented heap whereas, allocating larger objects is difficult.

Setting of parameters described herein may be established by a user, by an automated system, or default values may be used.

Figure 10:
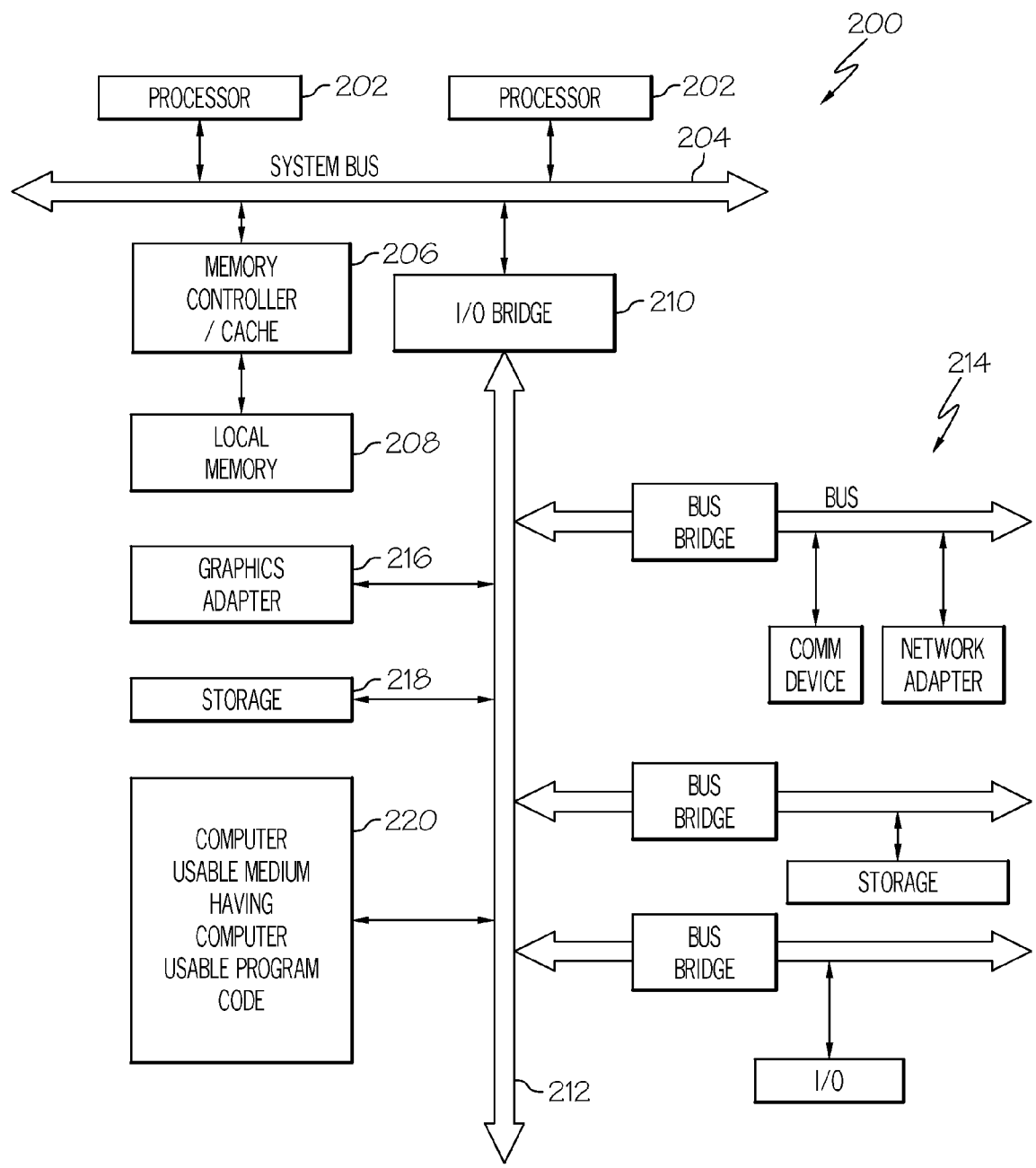
FIG. 10 is a block diagram of a computer system having a computer readable storage medium for implementing functions of the processing engine according to various aspects of the present invention.

Referring to FIG. 10, a block diagram of a data processing system is depicted in accordance with the present invention. Data processing system 200 may comprise a symmetric multiprocessor (SMP) system or other configuration including a plurality of processors 202 connected to system bus 204. Alternatively, a single processor 202 may be employed. Also connected to system bus 204 is memory controller/cache 206, which provides an interface to local memory 208. An I/O bus bridge 210 is connected to the system bus 204 and provides an interface to an I/O bus 212. The I/O bus may be utilized to support one or more buses and corresponding devices 214, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 216, storage 218 and a computer usable storage medium 220 having computer usable program code embodied thereon. The computer usable program code may be executed to implement any aspect of the present invention, for example, to implement any aspect of any of the methods, processes and/or system components illustrated in FIGS. 1-9. Moreover, the computer usable program code may be utilized to implement any other processes that are used to perform heap allocation, management and/or maintenance, as set out further herein.

The data processing system depicted in FIG. 10 may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon, e.g., providing program code for use by or in connection with a computer or any instruction execution system.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of managing multiple object areas in a memory heap, comprising:
   allocating a memory heap as a contiguous range of memory;
   allocating a small object area within the memory heap having an initial start at a first end of the memory heap;
   allocating a large object area within the memory heap having an initial start at a second end of the memory heap opposite the first end such that the small object area and the large object area grow in opposite directions inward within the memory heap; and
   performing allocations into the memory heap based upon a predetermined allocation policy such that the large object area is reserved for the allocation of large objects.

2. The method according to claim 1, wherein the predetermined allocation policy defines allocations into the memory heap such that only small objects are allocated into the small object area and only large objects are allocated into the large object area of the memory heap.

3. The method according to claim 1, wherein the predetermined allocation policy defines allocations into the memory heap such that small and large objects are initially allocated into the small object area until a predetermined condition is satisfied, thereafter, large objects are allocated into the large object area of the memory heap.

4. The method according to claim 3, wherein the predetermined condition comprises the small object area being too fragmented to allocate a new large object.

5. The method of claim 1, further comprising maintaining a first free list comprising the size and next address of free space solely for the small object area, and a second free list comprising the size and next address of free space solely for the large object area.

6. The method of claim 1, further comprising utilizing heuristics to decide whether expansion or contraction of the memory heap based upon the differences in object allocation patterns of the small object area and the large object area.

7. The method of claim 1, further comprising performing compaction to defragment a select one of the small object area and the large object area independent of the other.

8. The method of claim 1, further comprising:
performing expansion and contraction of the small object area independently of expansion and contraction of the large object area;
wherein expansion expands the small object area and large object area towards each other, and contraction shrinks the small object area and large object area away from each other.

9. The method of claim 1, further comprising modifying the ratio of the small object area to the large object area in the memory heap.

10. The method according to claim 1, further comprising:
managing the heap so as to distribute free space among the small object area and the large object area within a heap so as to avoid unnecessary garbage collections.

11. The method according to claim 1, further comprising:
managing the heap so as to share expanded free space among the small object area and the large object area within the heap; and
managing the heap so as to reclaim free space during heap shrinkage.

12. The method according to claim 1, further comprising:
managing the heap so as to avoid unintended movement between areas of a heap during compaction.

13. Computer-readable hardware with an executable program for managing multiple object areas in a memory heap, wherein the program instructs a processor to perform:
allocating, with the processor, a memory heap as a contiguous range of memory;
allocating, with the processor, a small object area within the memory heap having an initial start at a first end of the memory heap;
allocating, with the processor, a large object area within the memory heap having an initial start at a second end of the memory heap opposite the first end such that the small object area and the large object area grow in opposite directions inward within the memory heap; and
allocating, with the processor, allocations into the memory heap based upon a predetermined allocation policy such that the large object area is reserved for the allocation of large objects.

14. The computer-readable hardware according to claim 13, wherein the predetermined allocation policy comprises defining allocations into the memory heap such that only small objects are allocated into the small object area and only large objects are allocated into the large object area of the memory heap.

15. The computer-readable hardware according to claim 13, wherein the predetermined allocation policy comprises defining allocations into the memory heap such that small and large objects are initially allocated into the small object area until a predetermined condition is satisfied, thereafter, large objects are allocated into the large object area of the memory heap.

16. The computer-readable hardware according to claim 15, wherein the predetermined condition comprises determining whether the small object area is too fragmented to allocate a new large object.

17. The computer-readable hardware of claim 13, wherein the program further instructs the processor to perform: maintaining a first free list comprising the size and next address of free space solely for the small object area, and a second free list comprising the size and next address of free space solely for the large object area.

18. The computer-readable hardware of claim 13, wherein the program further instructs the processor to perform: utilizing heuristics to decide whether expansion or contraction of the memory heap based upon the differences in object allocation patterns of the small object area and the large object area.

19. The computer-readable hardware of claim 13, wherein the program further instructs the processor to perform: performing compaction to defragment a select one of the small object area and the large object area independent of the other.

20. The computer-readable hardware of claim 13, wherein the program further instructs the processor to perform:
performing expansion and contraction of the small object area independently of expansion and contraction of the large object area;
wherein performing expansion expands the small object area and large object area towards each other, and contraction shrinks the small object area and large object area away from each other.

21. The computer-readable hardware of claim 13, wherein the program further instructs the processor to perform modifying the ratio of the small object area to the large object area in the memory heap.

22. The computer-readable hardware according to claim 13, wherein the program further instructs the processor to perform:
managing the heap so as to distribute free space among the small object area and the large object area within a heap so as to avoid unnecessary garbage collections.

23. The computer-readable hardware according to claim 13, wherein the program further instructs the processor to perform:
managing the heap so as to share expanded free space among the small object area and the large object area within the heap; and
managing the heap so as to reclaim free space during heap shrinkage.

24. The computer-readable hardware according to claim 13, wherein the program further instructs the processor to perform:
managing the heap so as to avoid unintended movement between areas of a heap during compaction.

* * * * *